United States Patent [19]
Burnett et al.

[11] 4,370,083
[45] Jan. 25, 1983

[54] MULTIPLE THREADED FASTENER ASSEMBLY

[75] Inventors: William R. Burnett, Palo Alto; Charles T. Thompson, Cupertino, both of Calif.

[73] Assignee: Varian Associates, Inc., Palo Alto, Calif.

[21] Appl. No.: 176,171

[22] Filed: Aug. 7, 1980

[51] Int. Cl.³ .................. F16B 37/00; F16B 39/28
[52] U.S. Cl. .................................. 411/87; 411/427
[58] Field of Search .............. 411/87, 90, 92, 88, 411/119, 116, 427, 432, 548, 83, 81, 521

[56] References Cited

U.S. PATENT DOCUMENTS

| | | | |
|---|---|---|---|
| 751,525 | 2/1904 | Liebrock | 411/83 X |
| 1,818,237 | 8/1931 | Medean, Jr. | 411/116 X |
| 3,280,466 | 10/1966 | Heimberger | 411/427 X |
| 3,557,402 | 1/1971 | Koehl | 411/521 X |

FOREIGN PATENT DOCUMENTS 668696 7/1929 France .................. 292/307 R

Primary Examiner—Ramon S. Britts
Attorney, Agent, or Firm—Stanley Z. Cole; Leon F. Herbert

[57] ABSTRACT

A multiple threaded fastener assembly includes at least two hingedly interconnected members, each having a threaded bore therein constituting a nut for coaction with threaded bolts. The bolts operatively engage workpiece openings. Tightening of respective sets of interengaged bolts and nuts of the fastener assembly is effected by a single wrench operation since the torque or restraining force on one member is provided through the connection to the other member. Detents and indicating indicia may be provided for positive locating action of the members.

9 Claims, 11 Drawing Figures

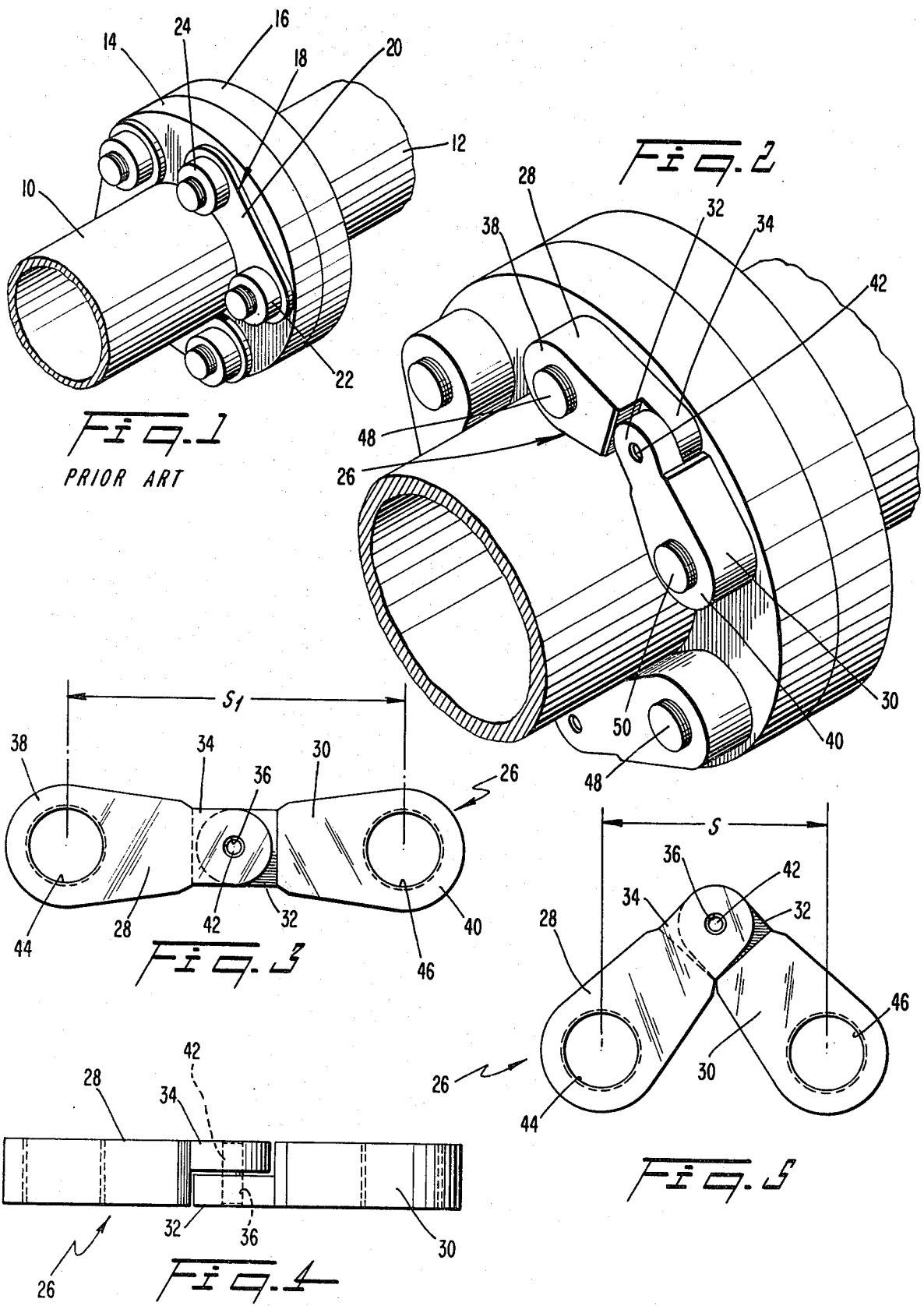

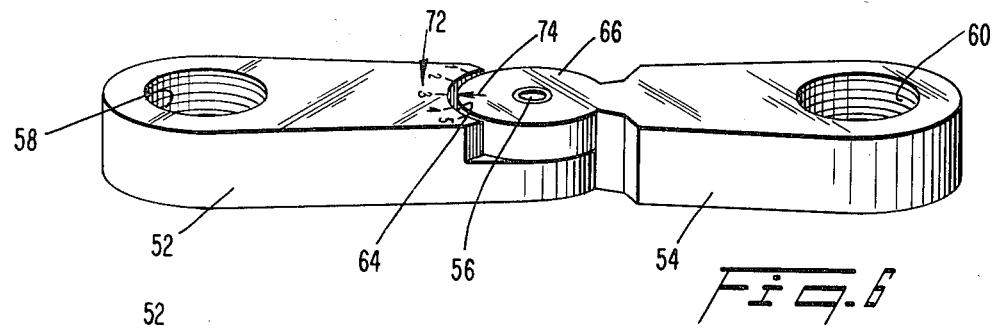
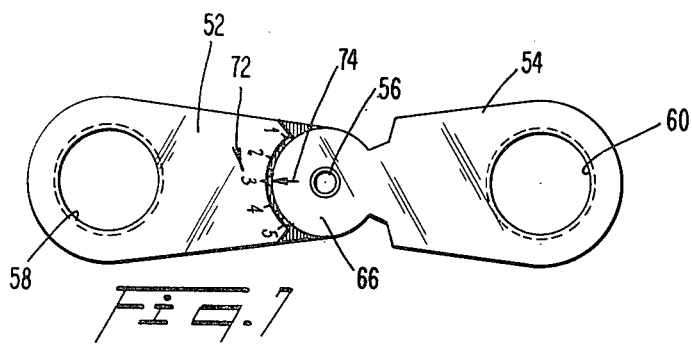
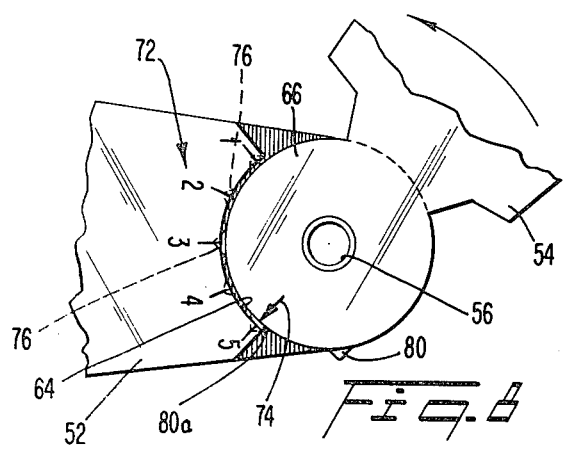
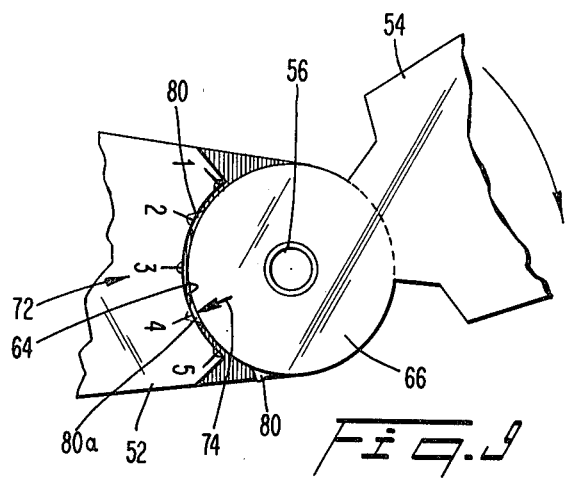
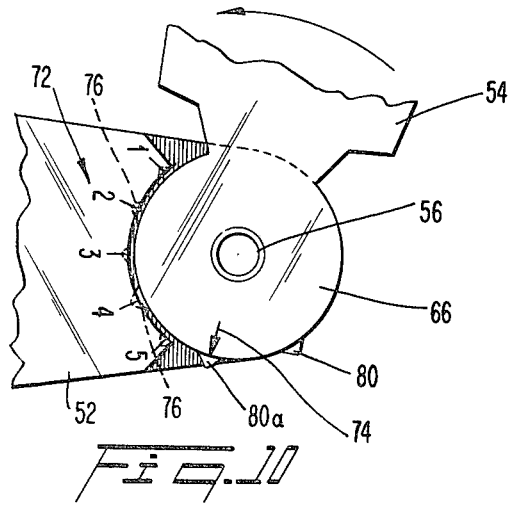
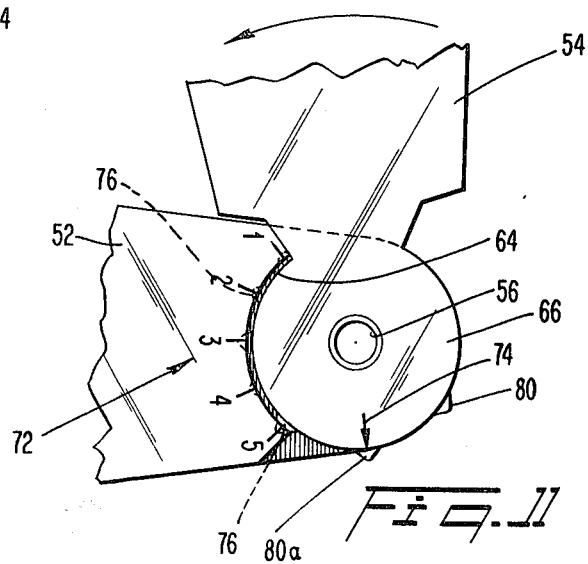

MULTIPLE THREADED FASTENER ASSEMBLY

TECHNICAL FIELD

This invention relates broadly to threaded fasteners, and more particularly, to an assembly of reusable and/or replaceable nuts that are coupled so that tightening may be effected by single wrench operation.

BACKGROUND OF THE INVENTION

Heretofore, multiple nut type fastening units have been utilized. One of the better known previous structures consists of stamped metal plates having two threaded holes on fixed centers, and known in the art as Plate Nuts. The two threaded holes in this previous construction, being on fixed centers, do not lend themselves to use accommodating a broad range of hole spacings in a workpiece.

The Plate Nut has found acceptable use for various specific fastening needs, such as for attaching two coupling flanges of pipes. As will be apparent, the Plate Nut with at least two threaded apertures is positioned on one side of the abutting flanges and the bolts are inserted and hand-tightened from the other side. Only one wrench is needed for tightening the bolts since the Plate Nut holds itself at the two points where the bolts are inserted.

In the fastener industry in general, Gang Channels, Self-Wrenching Nuts, Clip-On-Nuts, and Anchor Nuts are also known and used. These prior constructions are adapted for single wrench operation, or self-wrenching, which operationally require only a single wrench applied to the head of the bolt for tightening of a bolt and nut set, with no tool applied to the nut itself. This basically is provided by having some auxiliary structure on a carrying member to apply a torque or restraining force to the nut while the bolt is torqued by a single wrench.

The Gang Channels consist of a metal channel formed so as to trap a plurality or series of nuts on roughly fixed centers. These channels are susceptible of having many different shapes and containing varying quantities and types of nuts.

Self-Wrenching Nuts are nuts specially designed for particular applications. In this case, a part of the nut interferes with a stationary portion on a part being joined as the bolt is relatively rotated during assembly on a workpiece.

Clip-On Nuts are of a self-wrenching variety wherein the carrying member is designed to clip over the edge of thin sheet material and hold the nut fast.

Anchor Nuts are constituted by nuts which are joined to the workpiece by secondary fasteners including such as, for example, rivets, screws, etc. The latter cannot be broadly considered as replaceable nuts, depending on the secondary fasteners used. Welding, which has been heretofore used, would generally be considered as precluding replacement or reuse. This type of fastener, generally referred to as Weld Nuts, are accordingly not considered to be prior art. If permanent rivets are used, or self-clinching types of nuts which are pressed into the workpiece are used, these likewise cannot be considered as reusable and/or replaceable nuts.

Generally the known prior art constructions have the general disadvantage that each type of unit fits only specific applications. Some, for example, are adapted for use only on the same fixed center spacings, while others fit only applications which provide appropriate interference between the nuts and the workpiece. Other prior types cannot be considered as really self-contained.

It is thus an object of the present invention to provide a multiple threaded fastener, or multiple nut assembly, adapted for single wrench fastening and which accommodates use over a broad range of variously spaced workpiece openings, and generally overcomes the drawbacks and disadvantages of previously known and used types.

DISCLOSURE OF INVENTION

In accomplishing the aforementioned object of the invention, broadly speaking, two nuts are joined by means of a hinge, and the overall construction can be referred to as Swing Nuts. The assembly consists of just three elements, namely, two members having threaded bores constituting nuts, with the members being joined by a hinge.

Functionally, a first bolt or screw is inserted through an opening in a workpiece and started in one of the threaded bores constituting a first nut of the assembly. Before tightening this screw or bolt, a second one is inserted through an adjacent opening or hole in the workpiece and started in the second threaded bore or second nut of the other member of the assembly. The hinge action between the two members, and accordingly the two nuts, permits the second nut to be accurately positioned with respect to a second hole in the workpiece. The second hole does not have to be at a fixed spacing from the first, but may be at any location within the range of adjustable movement between the members. With both bolts hand-started in their respective nuts, each bolt can now be tightened, using a wrench only on the bolt, and obviating the necessity of use of an additional wrench on that portion of the apparatus constituting the nut.

Additional advantages, objects and variations possible in the present invention will be more readily apparent from the accompanying drawings disclosing variations in the invention, when taken together with the following description.

BRIEF DESCRIPTION OF DRAWINGS

FIG. 1 is a perspective view of a prior art Plate Nut installation as referred to hereinabove;

FIG. 2 is an enlarged perspective view of an installation using multiple threaded fastener assemblies, Swing Nuts, constituting a preferred form of the present invention;

FIG. 3 is a top plan view of a multiple threaded fastener assembly;

FIG. 4 is a side elevational view of the assembly shown in FIG. 3;

FIG. 5 is a top plan view of the fastener assembly of FIG. 3, with the two members or arms thereof in a different angular relationship so as to accommodate a different spacing of workpiece openings with which the fastener assembly is to be used;

FIG. 6 is a perspective view of a modified form of multiple threaded fastener according to the invention;

FIG. 7 is a top plan view of the fastener assembly of FIG. 6;

FIG. 8 is an enlarged fragmentary plan view of the fastener of FIG. 7, with the arms in an angularly adjusted position, and disclosing positioning detents and position indicating indicia; and FIGS. 9, 10 and 11 are views similar to FIG. 8 with the arms or members being in different adjusted positions.

BEST MODE OF CARRYING OUT THE INVENTION

Referring now in greater detail to the drawings, there is disclosed in FIG. 1 a multiple nut known in the art as a Plate Nut, and is shown being used for connecting two flanged pipes or conduits. The pipes or conduits 10 and 12, respectively, have on the ends thereof circular flanges 14, 16, through which a plurality of bores or holes is provided. The holes are spaced about the flanges for insertion of interconnecting bolts. The cooperating Plate Nut assemblies are generally indicated at 18. These prior art Plate Nut assemblies include a central plate member 20 and have internally threaded nuts 22, 24.

Functionally, threaded bolts are passed through the openings in the flanges. A first bolt is engaged and hand-tightened in one of the nuts, which is followed by another bolt being passed through an adjacent flange hole and engaged and hand-tightened in the adjacent nut of the Plate Nut. Upon applying a tightening force by means of a single wrench on the bolt head side, not shown, of the bolts, the Plate Nut and the nuts formed as portions thereof serve to apply, one to another, a torque or restraining force so that it is not necessary to utilize a wrench or other holding member on the nut per se. It will be appreciated, however, that this prior art structure is adapted to only a single specific configuration of the members being secured one to another, and to a single spacing of the holes through the flanges. Such a Plate Nut, while having the advantages of single wrench operation and constituting a reusable or replaceable nut, is, due to the above features, of limited application, and requires, for other uses or areas of use, different arrangements and sizes.

The present invention overcomes these drawbacks. Referring to FIGS. 2–5 inclusive, the multiple threaded fastener assembly of the present invention generally designated 26 can comprise two identically shaped and sized members or arms 28 and 30. Each arm or member has an identical inner or smaller end 32, 34 with mating openings therethrough at 36. These ends 32, 34 are tapered and of reduced thickness as compared to the outer or larger ends 38, 40. The smaller or inner ends are also formed with stepped down areas or recesses. The outer portions of the members or arms 28 and 30 are preferably rounded.

A pivot member or pin 42 passes into and through the mating openings 36 and pivotally interconnects the two arms 28, 30. This pin serves to interconnect the two arms in an angularly adjustable relationship one with the other, and permits movement of the arms into different positions, shown for example in FIGS. 2, 3 and 5, with the included angle therebetween varying.

The outer ends 38 and 40 are each provided with internally threaded bores or nuts 44, 46, and each of these constitutes one fastener means of the multiple threaded fastener assembly.

Several types of hinge means, including rivets and cotter pins, for example, are suitable for use as pivot member 42. Preferably, however, the pivot member or pin 42 consists of a rolled spring pin, formed by rolling a length of spring steel into cylindrical form with a spacing or gap provided between the ends of the rolled length. Insertion of such a pin in the mating holes or openings 36 is effected by inward compression of the rolled spring pin so that it is reduced in diameter and driving endwise into position. The pin thus applies a frictional force against the interior walls of the mating openings. This provides frictional interengagement of the two arms and permits a selective positioning of the arms, one with respect to the other, as shown in the drawings to accommodate a different specific spacing.

One spacing, in an inwardly folded position of the arms, is indicated by spacing S (FIG. 5), schematically indicating the distance or spacing between the respective centers of the nuts 44, 46. This spacing S is the minimum spacing of this particular assembly. The spacing $S_1$ shown in FIG. 3 is the maximum spacing of the assembly shown. The assembly is infinitely adjustable to any inbetween position of the two arms, such as the position of FIG. 2.

The hinged ends of the members 28, 30 are reduced in thickness and are offset so as to mate with each other by overlapping, as shown in FIG. 4. In this way, the top and bottom surfaces lie substantially in top and bottom planes respectively.

In operation, the arms of the fastener are simply adjusted to mate with openings in members to be connected, with the nut portions of the fastener positioned operatively over the holes. Bolts forming an additional part of said fastening means are inserted through the holes of the members to be connected. Then, the first bolt, such as bolt 48 of FIG. 2, is engaged and hand-tightened in nut 44. Next, the bolt 50 is engaged and hand-tightened in the nut 46. A single wrench operation, by application of a wrench to the bolt head, not shown, serves to tighten the bolts 48, 50. The interconnected arms 28, 30 provide a torque or restraining force such that a second wrench is not required on the nuts 44, 46.

Of substantial significance is the fact that the two arms 28, 30 can be identical, one with another, for ease of manufacture and assembly. A preselected size nut opening, and therefore bolt size, is designed into the fastener. The operative lengths of the arms can be varied, thereby providing different sizes having different ranges of adjustment. The pivot pin 42 forming the interconnection is such as to permit ready assembly of two identical arms with one another and ease of adjustment of the arms to a desired angular relationship.

Utilization of the hinge concept joining the two arms 28, 30 is an important key to this greater flexibility and freedom or usage. The spacing can be accommodated either linearly (not shown) or curvilinearly, such as around the pipe coupling shown (FIG. 2).

An alternative embodiment of the fastener assembly is shown in FIGS. 6–11 inclusive of the drawings. This assembly embodies the underlying basic principle of the present invention as to the use of two interconnected members or arms. A first arm 52 and a second arm 54, are joined by pivot pin 56, which can again by a rolled spring type pin similar to the pivot pin 42 in the first embodiment. The first arm 52 is provided with a threaded bore constituting a nut 58, and the second arm 54 is likewise provided with a threaded bore constituting a nut 60.

The two arms 52, 54 in this embodiment are not identical. The arm 52 has a recess on the narrow end thereof. This recess has a rear curvilinear face 64 to accommodate circular end 66 of arm 54. There is a space between the face 64 and the external face of circular end 66.

The upper surface of arm 52 adjacent curvilinear face 64 is provided with a plurality of indicia at 72, which are radially spaced marks and numerical designations. These markings are adapted for coacting with a single pointer 74 on circular end 66 of arm 54.

The curvilinear face 64 has, at each position of the indicia 1-5, as shown, a detent or depression 76, only some of which have been so designated for clarity. The external curvilinear end face of circular end 66 is provided with at least one and preferably a plurality of protrusions or nodes 80. A central protrusion 80a corresponds to the pointer 74, and serves as an additional positional indicator by coacting with the indicia 72. The rolled spring pin 56 provides an advantageous degree of resilience between the arms 52, 54. This permits the two arms 52, 54 to angularly rotate and snap into position with respect to one another, as shown in FIGS. 7-11 inclusive. The resiliency of the pivot pin 56 permits seating engagement of the nodes 80 in depressions 76, and, conversely, permits displacement therefrom for angular adjustment of the arms. A positive retention force is provided by engagement of the nodes in the depressions. Thus, for a known positional setting or relationship of openings 58, 60 for coacting with prepositioned bolts, not shown, the positive angular relationship of the two arms can be preset by the user.

In summary, a multiple threaded fastener assembly comprises three elements: two arms with integral nuts, joined by a hinge or pivot pin. Functionally, a bolt is inserted through the workpieces and hand-started in one of the nuts. Before tightening the first bolt, a second bolt is inserted through an adjacent hole in the workpieces and started in the second nut. The two arms forming the assembly are adjusted to the correct spacing between the two holes as the second is inserted. With both bolts started in their nuts, each can then be tightened, using a wrench only on the bolt head. The fastener assembly of the present invention eliminates the need for an exact fit between the assembly and the workpiece due to the adjustability feature. Each size assembly can cover a range of hole spacings.

In this disclosure, there is shown and described only the preferred embodiments of the invention, but as aforementioned, it is to be understood that the invention is capable or use in various other combinations and environments and is capable of changes or modifications within the scope of the inventive concept as expressed herein.

We claim:

1. A multiple fastener assembly comprising two separate members, each said member having a threaded bore therein forming a nut for receiving a fastening means, hinge means interconnecting said members and providing for variable positioning of one said member with respect to the other angularly about the axis of said hinge means, to thereby adjust the relative spacing between the two said bores, and whereby said members are held by each other during the fastening operation, and said bores having their axes parallel to said axis of the hinge means.

2. A multiple fastener assembly as claimed in claim 1, further comprising articles to be fastened, bolts passing through aligned holes in said articles, said bolts having threaded ends for engagement with said nuts, the tightening of said bolts in said nuts requiring only a single tool operatively applied to the ends of said bolts opposite to the ends thereof received in said nuts, and said hinge means being disconnected from said articles except for the connection formed by said bolts.

3. A multiple fastener assembly as claimed in claim 1, wherein said hinge means interconnecting said members is a rolled pin of spring material, said spring material having the shape of a single wall cylinder having an axial slot which permits said wall to exert an expansion force and thereby apply a resilient frictional engagement between said members, and at least partially angularly retain one member with respect to the other.

4. A multiple fastener assembly as claimed in claim 1, wherein said members are elongated and identical in configuration, said nuts being positioned at one end and the hinge means at the other end.

5. A multiple fastener assembly as claimed in claim 4, wherein said other ends having the hinge means being of a reduced thickness, said other ends being placed in overlapping relationship whereby the top and bottom surfaces lie substantially in top and bottom planes, respectively.

6. A multiple fastener assembly as claimed in claim 1, wherein each said threaded bore is proximate one end of its respective member, and said hinge means being proximate the other of the ends of said members, a surface of one said member proximate the hinged end having angular position indicia thereon, the adjacent end of the other said member having a surface thereof with a coacting indicia marking whereby the angular disposition of one member with respect to the other is visually presented.

7. A multiple fastener assembly as claimed in claim 6, wherein said end of said member with the indicia thereon having a reduced thickness and a concave face therein, said face having angularly spaced detents therein, the coacting end of the other said member having a cooperating reduced thickness and a convex curvilinear face portion matedly positioned in said concave face, said convex face having at least one protrusion extending therefrom and being selectively matedly engageable in said spaced detents, whereby positive positions of said members may be selected.

8. A multiple fastener assembly as claimed in claim 7, wherein said hinge means includes a rolled spring pin, said rolled spring pin so interengaging said two members as to permit frictional operational engagement and release between said protrusions and said detents.

9. A multiple fastener assembly as claimed in claim 1 wherein one surface portion of each said member in the area surrounding said bore forms a planar surface normal to the axis of said bore.

* * * * *